(12) United States Patent
Alataas

(10) Patent No.: US 9,457,709 B2
(45) Date of Patent: Oct. 4, 2016

(54) BICYCLE HELMET WITH AN ADAPTIVE LIGHT NOTIFICATION SYSTEM THAT VARIES BRIGHTNESS

(71) Applicant: Reem Jafar Alataas, Bridgeport, CT (US)

(72) Inventor: Reem Jafar Alataas, Bridgeport, CT (US)

( * ) Notice: Subject to any disclaimer, the term of this patent is extended or adjusted under 35 U.S.C. 154(b) by 114 days.

(21) Appl. No.: 14/554,357

(22) Filed: Nov. 26, 2014

(65) Prior Publication Data

US 2016/0144773 A1    May 26, 2016

(51) Int. Cl.
*G08B 21/00* (2006.01)
*B60Q 1/26* (2006.01)
*B60Q 1/38* (2006.01)
*B60Q 1/44* (2006.01)
*A42B 3/04* (2006.01)

(52) U.S. Cl.
CPC ........... *B60Q 1/2676* (2013.01); *A42B 3/0453* (2013.01); *B60Q 1/38* (2013.01); *B60Q 1/44* (2013.01)

(58) Field of Classification Search
CPC ................................................... B60Q 1/2676
USPC ....................... 340/425.5, 432, 475; 362/105
See application file for complete search history.

(56) References Cited

U.S. PATENT DOCUMENTS

| 7,264,368 B2 | 9/2007 | Sherring |
| 2007/0285221 A1 | 12/2007 | Howe et al. |
| 2008/0084688 A1 | 4/2008 | White |
| 2013/0093585 A1 | 4/2013 | Ambani |

FOREIGN PATENT DOCUMENTS

EP    0185922 A2    7/1986

OTHER PUBLICATIONS

Balázs Filczer, "Dora helmet Concept," International Bicycle Design Competition. http://www.ibdcaward.org/ehtml/history/index.aspx?num=37; 2013.
Mark Prigg, "Pointing the way to safer cycling: The bike helmet with built-in indicator lights to warn drivers," Mail Online, http://www.dailymail.co.uk/sciencetech/article-2292069/Pointing-way-safer-cycling-New-helmet-built-indicator-lights.html , Mar. 12, 2013.
Mat Brett,"New 'Dora' helmet design incorporates indicators + video. road.cc pedal powered," http://road.cc/content/news/77524-new-dora-helmet-design-incorporates-indicators-video , Mar. 4, 2013.
Edwin Kee, "DORA Bike Helmet Has Indicators," übergizmo, http://www.ubergizmo.com/2013/02/dora-bike-helmet-has-indicators/ Feb. 26, 2013.
Allen Thomas, et al. "Integrated Helmet System," pp. 1-17, http://aux.coe.utsa.edu/~eesenior/fall2008/Team01/doc/DesignTeamOneFinalProposal.pdf , May 2, 2008.

*Primary Examiner* — Jeffery Hofsass
(74) *Attorney, Agent, or Firm* — Oblon, McClelland, Maier & Neustadt, L.L.P.

(57) ABSTRACT

An adaptive light notification system and method for activating turn signals using sensors. In addition, the adaptive light notification system and associated methodology activate sidelights by detecting a head movement. The system increases the safety of bicyclists.

20 Claims, 10 Drawing Sheets

| Right turn signal 102 | Left turn signal 104 | Backlight 106 | Head movement | 600 | 602 | 604 | 606 | 608 | 610 |
|---|---|---|---|---|---|---|---|---|---|
| ON | OFF | OFF | To the right | ON | OFF | OFF | OFF | OFF | ON |
| ON | OFF | OFF | To the left | OFF | OFF | ON | ON | OFF | OFF |
| OFF | ON | OFF | To the right | OFF | OFF | ON | ON | OFF | OFF |
| OFF | ON | OFF | To the left | ON | OFF | OFF | OFF | OFF | ON |
| OFF | OFF | ON | NA | OFF | ON | OFF | OFF | ON | OFF |

BICYCLE HELMET WITH AN ADAPTIVE LIGHT NOTIFICATION SYSTEM THAT VARIES BRIGHTNESS

GRANT OF NON-EXCLUSIVE RIGHT

This application was prepared with financial support from the Saudia Arabian Cultural Mission, and in consideration therefore the present inventor has granted The Kingdom of Saudi Arabia a non-exclusive right to practice the present invention.

BACKGROUND

Safety is an important concern for most cyclists and bikers. Often cyclists and drivers share the same route and clearly communicating a cyclist's intended direction of travel to the drivers and other cyclists decreases the risk of accidents. The cyclists often communicate their intended direction of travel using conventional hand signals. Most of the time, the hand signals are not enough to keep the cyclist safe especially under circumstances of poor ambient illumination. For example, drivers may not see the hand of the cyclist at night. The cyclists often wear a helmet for safety. Accordingly, it will be beneficial if turn signals were integrated into to the helmet in order to increase the visibility. In addition, the signal light's operation should be with minimal interaction from the cyclist.

The foregoing "background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

The present disclosure relates to an adaptive light notification system comprising a head protection enclosure, turn signals attached to the head protection enclosure and sensors to activate the turn signals.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 is an exemplary table showing the operation of an adaptive light notification system according to one example;

DETAILED DESCRIPTION

Figure 1:
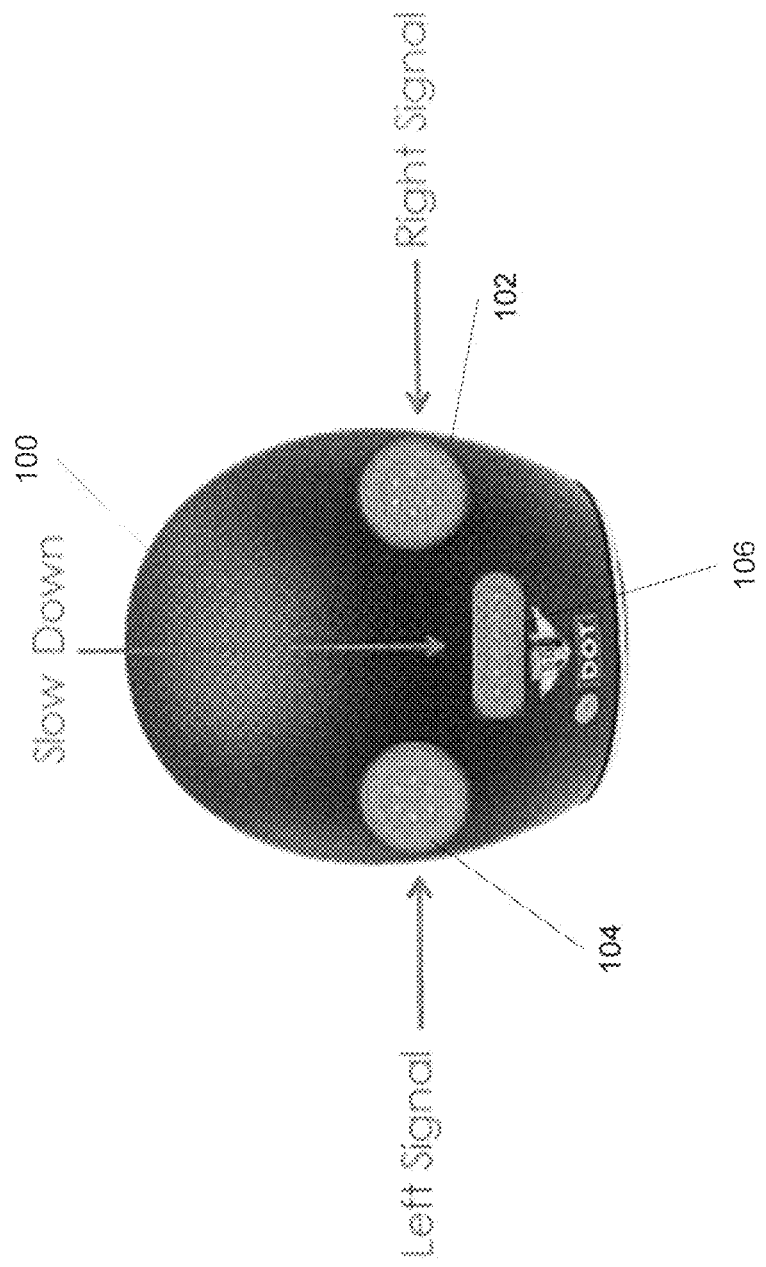
FIG. 1 is a schematic of a helmet with an adaptive light notification system according to one example.

Referring now to the drawings, wherein like reference numerals designate identical or corresponding parts throughout several views, the following description relates to an adaptive light notification system and associated methodology for activating turn signals in a head protection enclosure.

It is often desirable for cyclists to indicate their future direction for motorists. Cyclists often use hand signals to indicate their intentions to other traffic. For example, to indicate a left turn signal a cyclist may extend their left arm straight out in the direction of the turn. In order to indicate a right turn the cyclist may extend their right arm straight out in the direction of the turn. Many cyclists wear helmets when biking. Thus, integrating the turn signals into the head protection enclosure will increase the cyclist's visibility. The adaptive light notification system may be used with a bicycle, a scooter, a motorcycle, a moped or other vehicle that requires protective headgear.

The adaptive light notification system may include turn signals, sidelights, a backlight, and a front flashlight. Also included may be flashing or blinking lights. The turn signals are included in the adaptive light notification system to serve as directional indicators. The lights may be the same or different colors. Brake lights may further increase the probability that the bicycle will be noticed. Furthermore, the backlight aims to avoid rear end collisions by increasing the visibility of the bicycle and the cyclist. In addition, the front flashlight is included in the adaptive light notification system to improve the visibility of the bicycle and the cyclist to other road users and helps to avoid being in the blind spot of other road users. The cyclist needs to activate the turn signals quickly and with minimal intervention. The herein described system uses sensors that can be operated noninvasively. The hand free operation, without pushing any button, is as easy to the cyclist as it is easily combined with the hand signals. A user of the system may be the cyclist.

FIG. 1 is a schematic of a helmet with the adaptive light notification system according to one example. In one embodiment, the head protection enclosure may be a helmet. The schematic shows a rear view of the helmet 100. The turn signals may include a right turn signal 102 and a left turn signal 104 attached to the helmet 100. In selected embodiments, the backlight 106 may be positioned between the right turn signal 102 and the left turn signal 104. The right turn signal 102, the left turn signal 104, and the backlight 106 may be battery operated. In selected embodiments, the turn signals 102, 104 and the backlight 106 may be built in the helmet 100 during manufacturing. In other embodiments, the turn signals 102,104 and the backlight 106 may be removably attached to the helmet 100 using screws, tape or other methods as would be understood by one of ordinary skill art. When the turn signals 102, 104 and the backlight 106 are removably attached to the helmet 100, the turn signals 102, 104 and the backlight 106 may be designed to detach upon impact in order to avoid damaging the integrity of the helmet during a collision or accident.

Figure 2:
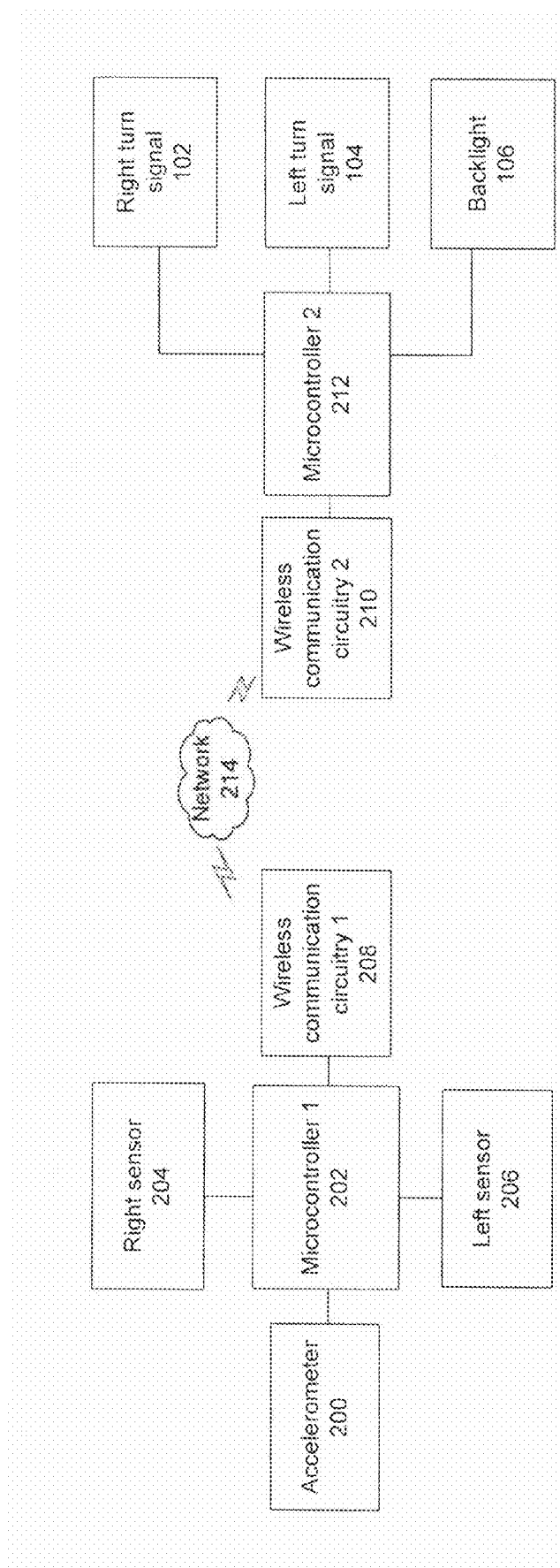
FIG. 2 is a block diagram representation of an adaptive light notification system according to one example.

FIG. 2 is a block diagram representation of the adaptive light notification system according to one example. The bicycle may be equipped with a first accelerometer 200 to detect whether a bike is in motion. The first accelerometer 200 is connected to a first microcontroller 202. The bicycle may also be equipped with sensors to activate the turn signals 102,104. In one embodiment, the sensors may comprise a right sensor 204 and a left sensor 206. The first microcontroller 202 may also be connected to the right sensor 204 and the left sensor 206. The first microcontroller 202 may activate the right sensor 204 and the left sensor 206 in response to determining that the bike in motion. The right sensor 204 and the left sensor 206 are used to turn on the right turn signal 102 and the left turn signal 104 by the user. The first microcontroller 202 is also connected to first wireless communication circuitry 208.

In one embodiment, the right sensor 204 and the left sensor 206 may be proximity sensors. Proximity sensors are sensitive to motion of objects within a detection zone of the proximity sensor. The proximity sensors detect the presence of an object without a physical contact. For example, the object may be the hand of the user. The sensors 204,206 may be positioned on the bicycle handles as explained and shown in FIG. 4. The user may indicate his intention to turn right by moving his hand in front of the right sensor 204. Similarly, in order to indicate a left turn the user may activate the left sensor 206 using the left hand. The proximity sensors may emit an electromagnetic field or a beam of electromagnetic radiation such as infrared. The proximity sensors detect changes in the reflected signal. The proximity sensor may be an active infrared (IR) detector in the form of photodiode pair to detect the user's hand. Pulses of IR light are emitted by one diode. When an object enters the detection zone, the other diode detects reflections of the emitted light off the object.

In other embodiments, each of the sensors 204,206 may be a position sensitive device (PSD). The position sensitive device may be a GP2D122/15 sharp. Unlike the IR sensors, position sensitive devices respond to the position of a returned signal. The PSD has a direct measure of the distance to the detected object. In selected embodiments, one PSD may be used to control the right turn signal 102 and the left turn signal 104.

In other embodiments, the right sensor 204 and the left sensor 206 may be a capacitive touch detector as would be understood by one of ordinary skill in the art. For example, the touch sensor may be a QT118H. Suitable capacitive touch detection systems are disclosed, for example, in U.S. Pat. No. 6,518,820 entitled "CIRCUIT ARRANGEMENT HAVING A CAPACITIVE SENSORELETEMET FOR A TOUCH CONTACT SWITCH" and U.S. Pat. No. 5,790,107 entitled "TOUCH SENSING METHOD AND APPARATUS" which are hereby incorporated herein in their entireties. In selected embodiments, the capacitive touch detectors may further obtain other readings such as heart rate, pulse oximetry measurements, and humidity level. The readings may be transmitted to host applications via a network 214. Other type of sensors may be used as would be recognized by one of ordinary skill in the art.

An accelerometer is an electromechanical device that measures linear acceleration to detect movement. In selected embodiments, the first accelerometer 200 may be one or more accelerometers. The first accelerometer 200 may be a digital accelerometer chosen according to the first microcontroller 202 specifications. The accelerometer may be a capacitive, piezoelectric, piezoresistive, hall effect, magnetoresitive or heat transfer based method to detect the acceleration.

The first wireless communication circuitry 208 may communicate with second wireless communication circuitry 210 that may be positioned in the helmet 100 via the network 214. The second wireless communication circuitry 210 is connected to a second microcontroller 212. The second microcontroller 212 may control the right turn signal 102, the left turn signal 104 and the backlight 106. The lights 102,104,106 are connected by cables to the first microcontroller 202. The lights 102,104,106 are also connected to a battery. In selected embodiments, the battery may be charged using solar energy via a photovoltaic cell as would be understood by one of ordinary skill in the art. In other embodiments, the battery may be charged from the power produced through pedaling by the user. In one embodiment, the battery charging method may be that disclosed in U.S. Pat. No. 6,768,273 B2 entitled "DYNAMO CONTROL CIRCUIT FOR A BICYCLE", the entire disclosure of which is incorporated herein by reference. The second microcontroller 212 may activate the backlight 106 in response to determining that the right sensor 204 and the left sensor 206 are not activated. The second microcontroller 212 and the second wireless communication circuitry 210 are positioned in the helmet 100. The position is chosen such as not to affect the user's equilibrium.

The first wireless communication circuitry 208, 210 maybe an Xbee, XRF or the like. The Xbee may use a plurality of RF frequencies including 2.4 GHZ, 902-928 MHz and 865-868 MHz. The frequencies may be chosen such that they do not interfere with other frequencies that may be used by communication devices to communicate with other users such as a walkie talkie, cellphones, and the like.

The first microcontroller 202 may be an Arduino board, a Raspberry Pi, a Beagle bone or the like. The Arduino board is a single board microcontroller. The first microcontroller 202 is further shown and described in FIG. 9. The second microcontroller 212 is further described and shown in FIG. 10.

Figure 3:
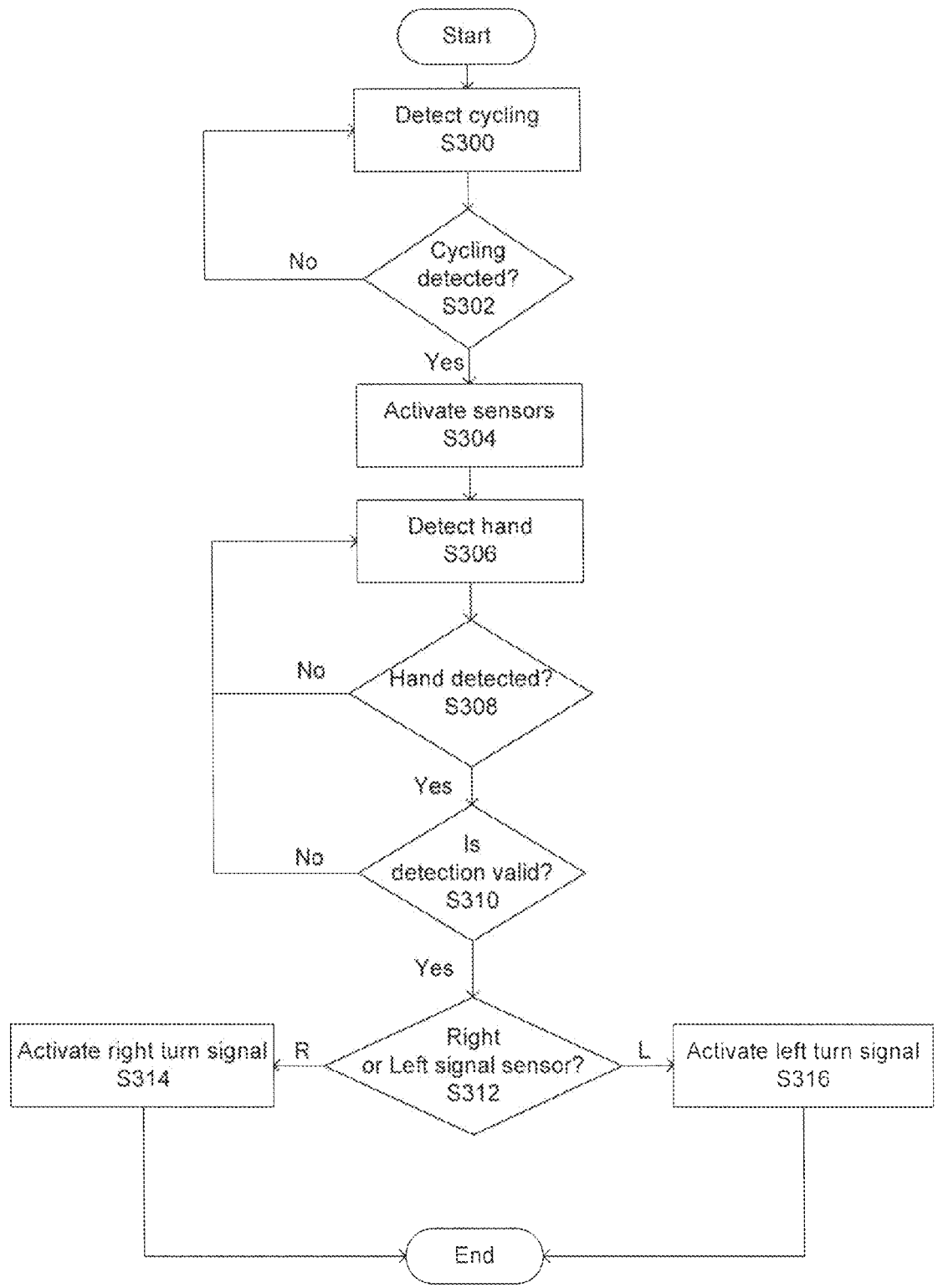
FIG. 3 is an exemplary flow chart to activate an adaptive light notification system according to one example.

FIG. 3 is an exemplary flow chart to activate a signal light according to one example. At step S300, the first microcontroller 202 may detect that the bicycle is in use. The built-in first accelerometer 200 may be used to detect when the bicycle is in motion. In other embodiments, the pedals may be used to detect the bike movement. At step 302, the first microcontroller 202 may check whether cycling has been detected. In response to determining that the bicycle is in use, the sensors 204, 206 are activated by the first microcontroller 202 at step S304. Then at step S306, the first microcontroller may detect a hand movement. At step S308, the first microcontroller 202 may check whether a signal is detected from the sensors 204, 206. In response to determining that the signal was detected the flow goes to step S310. In response to determining that the signal was not detected the flow go to step S306.

At step S310, the first microcontroller 202 may check whether the detection is valid. The validation method may depend on the sensor's type. For example, for touch detectors the first microcontroller 202 may record a contact time between the hand and the touch detector. Then, the first microcontroller 202 may compare the contact time with predetermined values. The predetermined values may be a lower predetermined threshold and an upper predetermined threshold. The lower predetermined threshold can screen out erroneous stray signals from the capacitive sensor, such as might be caused by rain, for example. The predetermined threshold may be 0.05 seconds. The lower predetermined threshold may depend on the sensitivity of the sensor used. The upper predetermined threshold may eliminate error due to the user holding the handle over the sensor. Thus, at step S310, the first microcontroller 202 may determine whether the contact time is between the lower predetermined threshold and the upper predetermined threshold. For a PSD type sensor the validation method may depend on the object position detected. For example, the first microcontroller 202 may determine whether the object position detected is between a minimum and a maximum distance threshold. At step S310, in response to determining that the detection is not valid the step goes back to step S306. At step 310, in response to determining that the detection is valid, the flow goes to step S312.

At step S312, the first microcontroller 202 may analyze the origin of the signal detected at step S306. In response to determining that the signal originated from the right sensor 204 then the right turn signal 102 is activated at step S314. In response to determining that the signal originated from the left sensor 206 then the left turn signal 104 is activated at step S316. The first microcontroller 202 may transmit an activation signal using the wireless communication circuitry 208. The second microcontroller 212 in response to receiving the activation signal, using the second wireless communication circuitry 210, activate the turn signals.

In selected embodiments, the first microcontroller 202 may also check whether the bicycle is idle. The first microcontroller 202 may monitor the signal received from the first accelerometer 200 to determine whether the bicycle is idle. The first microcontroller 202 may then compare the idle time with a predetermined period of time. For example, the predetermined period of time may be 5 minutes, 10 minutes, or 15 minutes. In response to determining that the idle time exceeds the predetermined period of time, the first microcontroller 202 may turn off the right sensor 204, the left sensor 206, the first wireless communication circuitry 208, the second wireless communication circuitry 210, the backlight 106 and the second microcontroller 212 to conserve battery energy. The predetermined period of time may be set according to the user preference. For example, the predetermined period may be set to exceed the average time the user has to stop at stop signs or traffic lights. In selected embodiment, the first accelerometer 200 may further be used to detect sudden deceleration. In response to detecting a sudden deceleration by the accelerometer, the first microcontroller 202 may activate a brake light. In other embodiments, once a deceleration is detected the first microcontroller 202 may send a signal to the second microcontroller 212 using the first wireless communication circuitry 208 and the second communication circuitry 210. The second microcontroller 212 may then increase the intensity of the backlight 106.

Figure 4:
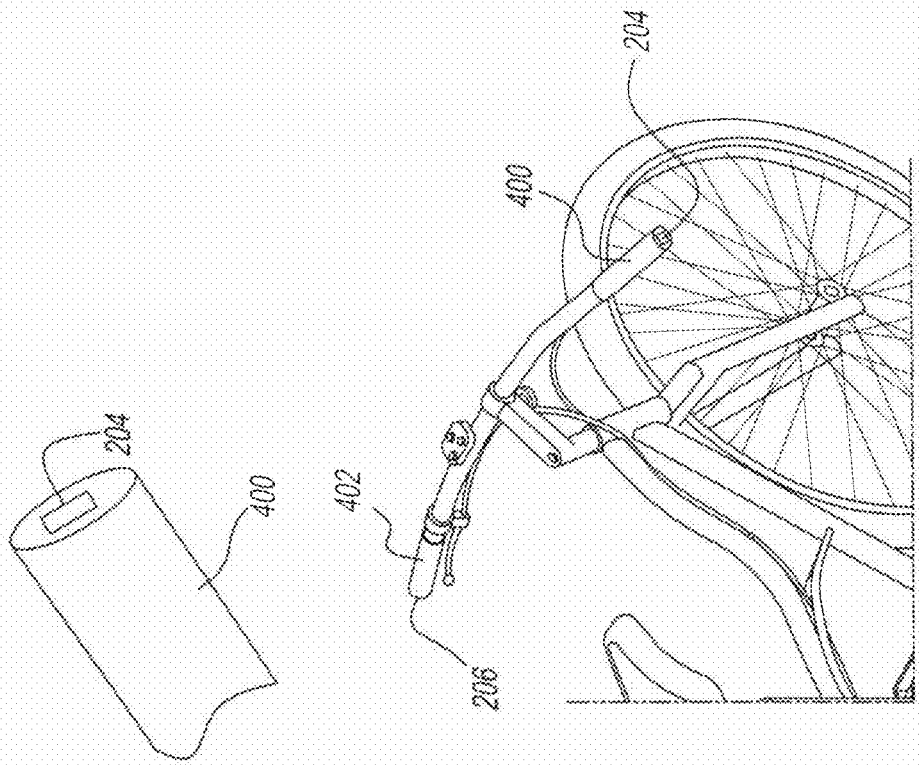
FIG. 4 is a schematic of bicycle handles with an adaptive light notification system according to one example.
Figure 4:
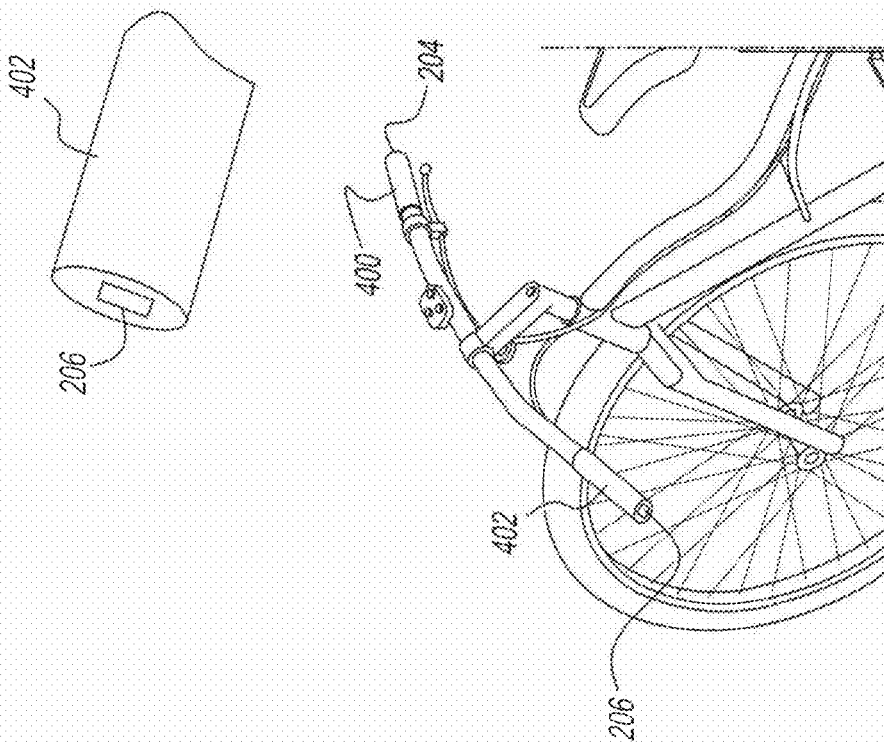

FIG. 4 is a schematic of bicycle handles with an adaptive light notification system according to one example. FIG. 4 shows a right bike handle 400 and a left bike handle 402. The right sensor is mounted on the right bike handle 400. The left sensor 206 is mounted on the left bike handle 402. In other embodiments, the sensors 204,206 may be mounted on either the left bike handle or the right bike handle according to the user preference. For example, the user may choose to mount the sensors 204,206 on the right bike handle if he uses his right hand to indicate either a right or left turn. The sensors 204,206 may be mounted on the bike handles using a strap.

Figure 5:
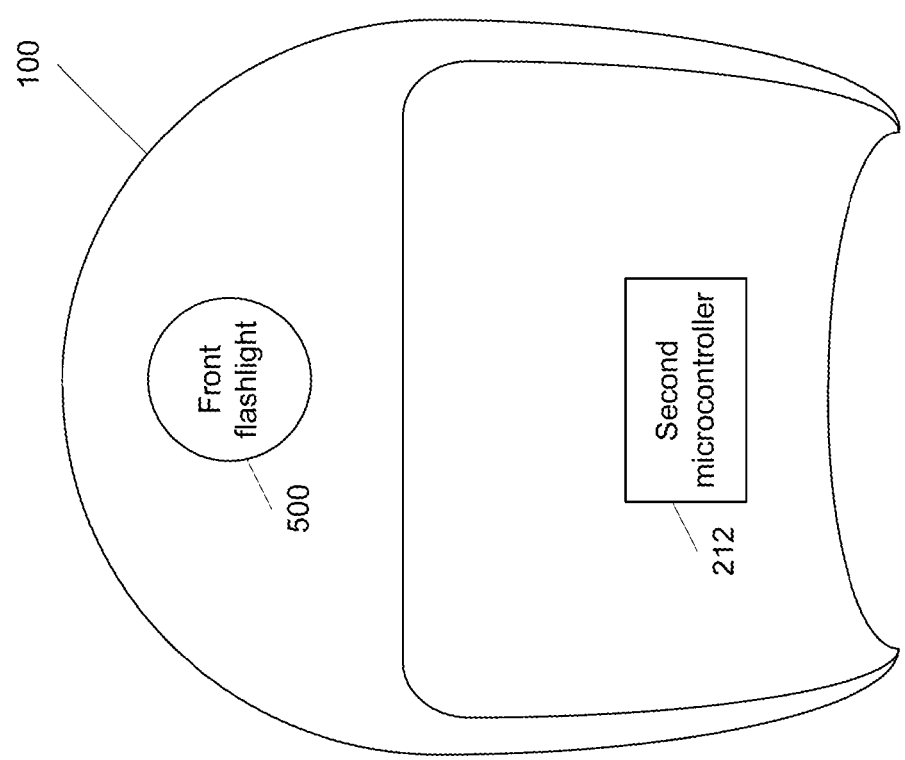
FIG. 5 is a schematic of a helmet with an adaptive light notification system according to one example.

FIG. 5 is a schematic of the helmet with an adaptive light notification system according to one example. FIG. 5 shows a front view of the helmet 100. The helmet 100 may further include the front flashlight 500. The front flashlight 500 may be activated by the second microcontroller 212. The second microcontroller 212 may be positioned as shown in FIG. 5 or in any other position within or around the helmet including within the light element housing.

In selected embodiments, the helmet 100 may include sidelights composed of three indicators on each side. The sidelights may increase the visibility of the cyclist to motorists from different directions. The sidelights may be activated in response to detecting a movement in the head of the user. For example, the sidelights may be activated when the user turn his head to check for motorists. Thus, the future direction of the user is visible to incoming motorists. In selected embodiments, a second accelerometer may be positioned on the helmet 100 to detect the movement in the head. In another embodiment, the turn signals 102,104 may also be activated in response to head movement or gestures such as two successive head movements in a particular direction. Such a system could be used in addition to the system including a wireless connection with a system having no wireless or wired connection to the cycle.

In addition, in another embodiment, the turn signals 102, 104 can be activated in response to detecting the corresponding hand signal by the driver of the cycle. For instance, if the driver of a bicycle makes a proper signal for a right turn, a sensor attached to the driver on for example a smartwatch or other smart band device could detect that the signal has been made. This information could be transmitted to the helmet system in order for the appropriate turn signal to be activated. Alternatively, the helmet could include a camera or some other type of sensor that detects the movement of the driver/operator of the cycle and detects the signal made by the operator/driver.

Figure 6B:
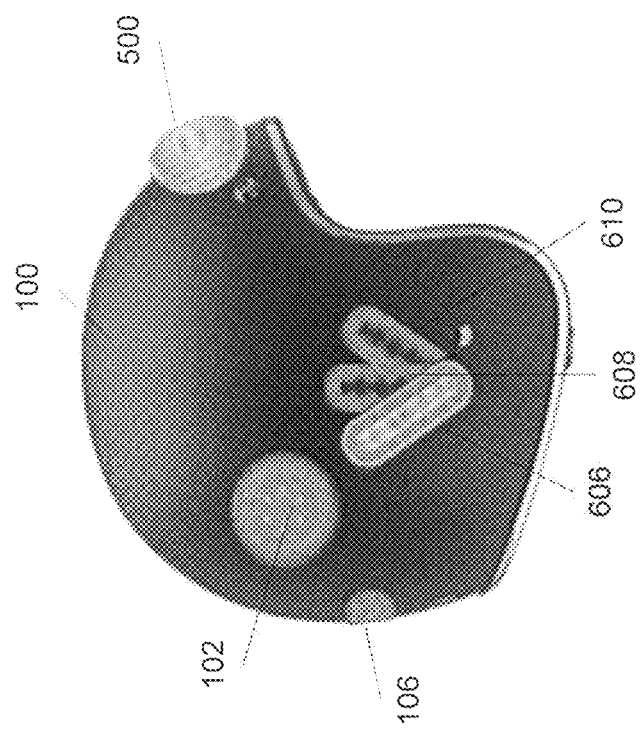
FIG. 6B illustrates another side view of a helmet with an adaptive light notification system according to one example.
Figure 6A:
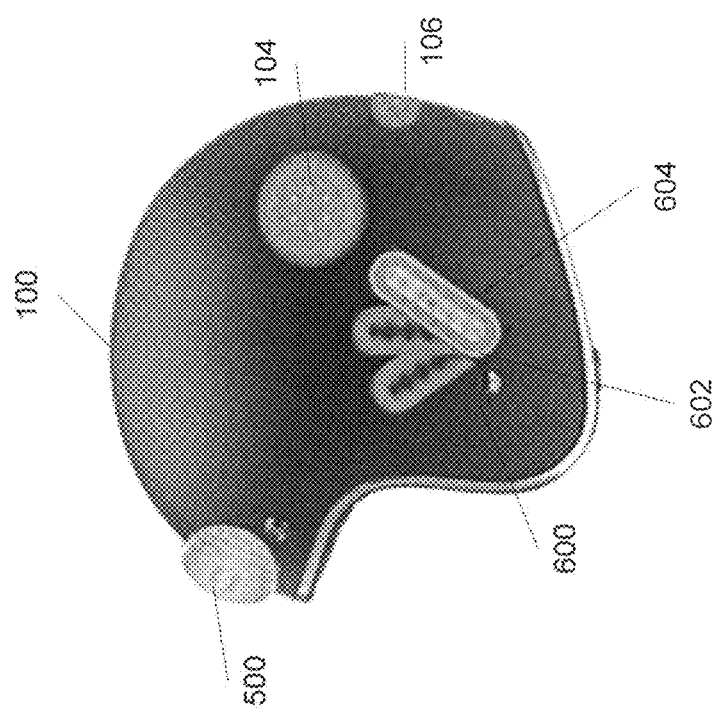
FIG. 6A illustrates a side view of a helmet with an adaptive light notification system according to one example.

FIGS. 6A and 6B illustrate the helmet with sidelights according to one example. FIG. 6A shows a side view of the helmet 100. The left sidelight may be composed of three indicators: A left side first indicator 600, a left side second indicator 602, and a left side third indicator 604. FIG. 6B shows another side view of the helmet 100. Similarly, the right sidelight may be composed from a right side first indicator 606, a left side second indicator 608 and a right side third indicator 610.

Figure 7:
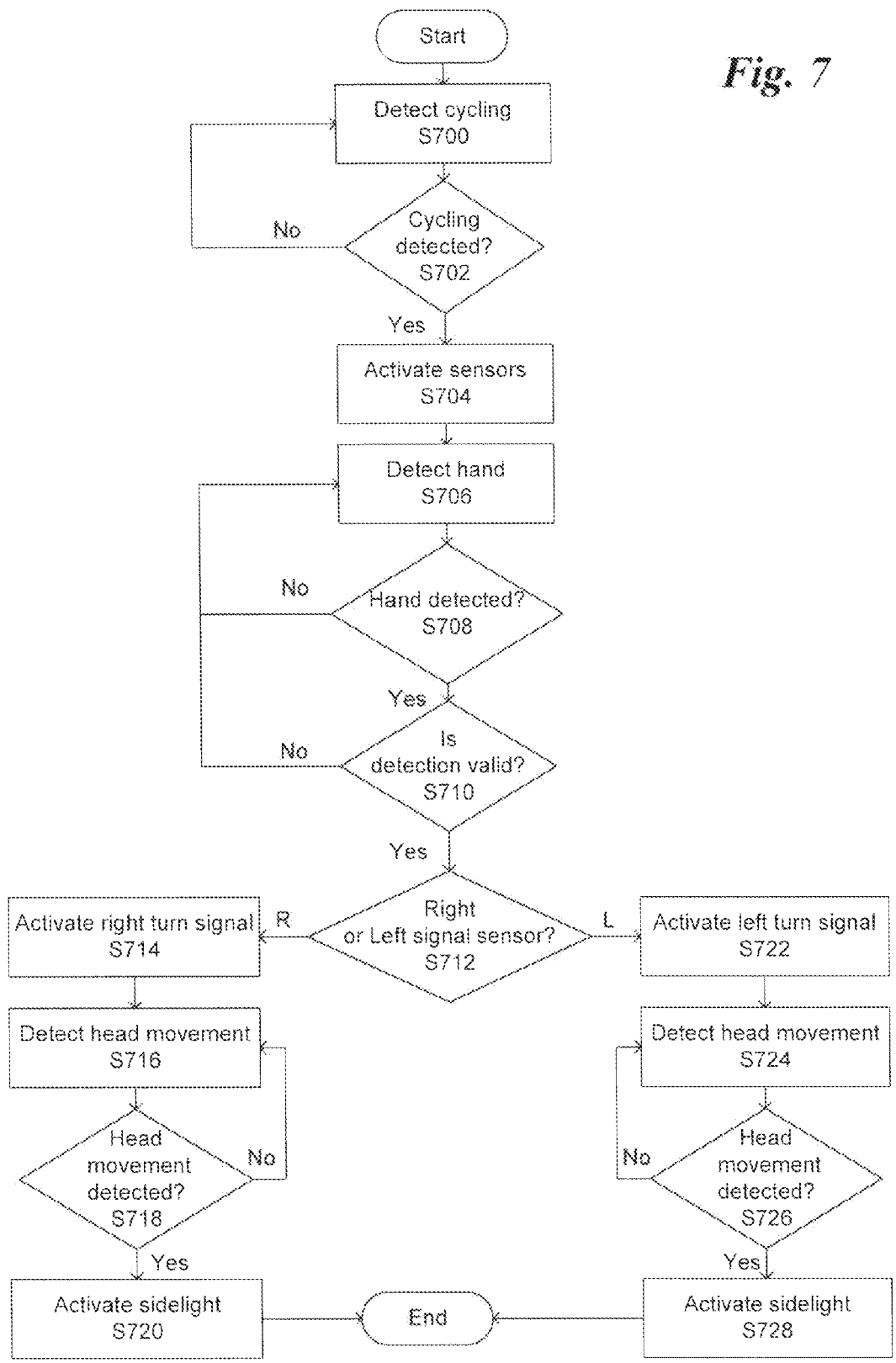
FIG. 7 is an exemplary flow chart to activate an adaptive light notification system according to one example.

FIG. 7 is an exemplary flow chart to activate the signal light according to one example. At step S700, the first microcontroller 202 may detect that the bicycle is in use. The built in first accelerometer 200 may be used to detect when the bike is in motion. At step 702, the first microcontroller 202 may check whether cycling has been detected. In response to determining that the bicycle is in use, the sensors 204, 206 are activated by the first microcontroller 202 at step S704. Then at step S706, the first microcontroller 202 may detect a hand movement. At step S708, the first microcontroller 202 may check whether a signal is detected from the sensors 204, 206. In response to determining that the signal was detected the flow goes to step S710. In response to determining that the signal was not detected the flows go to step S706.

At step S710, the first microcontroller 202 may check whether the detection is valid as explained in FIG. 3. At step S710, in response to determining that the detection is not valid the step goes back to step S706. At step 710, in response to determining that the detection is valid, the flow goes to step S712.

At step S712, the first microcontroller 202 may analyze the origin of the signal detected at step S706. In response to determining that the signal originated from the right sensor 204 then the right turn signal 102 is activated at step S714 and the flow goes to step S716. In response to determining that the signal originated from the left sensor 206 then the left turn signal 104 is illuminated at step S722 and the flow goes to step S724. At step S716, the second microcontroller 212 may detect head movement using the second accelerometer. At step S718, the second microcontroller 212 may check whether a head movement was detected. At step S720, the sidelight is activated. In selected embodiments, the second accelerometer may further detect the direction of the head movement. The second microcontroller 212 may then activate the corresponding light as explained and shown in FIG. 8. At step S724, the second microcontroller 212 may detect head movement using the second accelerometer. At step S726, the second microcontroller 212 may check whether head movement has been detected. In response to determining that head movement has been detected, the second microcontroller 212 activates the corresponding sidelight at step S728. In response to determining that there is no head movement, the step goes to S724.

The second accelerometer may be a dual axes linear accelerometer such as a standard analog device ADXL212 sensor with a resolution of 1 mg.

In selected embodiments, the signal lights 102,104, 600, 604, 606, 610 may be activated for a predetermined period of time according to the user preference. For example, the signal lights may be activated for 30 seconds. In other embodiments, the user may turn off the signal lights by activating the sensors. In addition, the light intensity may be related to the time of the day.

FIG. 8 is a table that shows the operation of the signal light according to one example. 800 shows the different combinations of the sidelights activation depending on the user intended turn direction and head movement. For example, the table 800 shows that when the right turn signal 102 is "ON", the left turn 104 and the backlight 106 are "OFF". In addition, in response to detecting a head movement direction to the right then the second microcontroller may activate the left side first indicator 600 and the right side third indicator 610. Others lights 602,604,606,608 are "OFF".

In addition, helmet system my further include a camera or a plurality of cameras or object detection sensors which detect the presence of other vehicles or cycles within a predetermined area of the cycle. Based on this information, the cycle may modify the brightness of the signals from 0-100. For instance, if a vehicle is detected from the imaging information (such as via the headlights) as being within a predetermined distance, a brighter value for the signals (which uses more power) may be applied. In contrast, when no vehicles are detected within a predetermined range of the cycle, a lower brightness may be used. Similar to brightness, duration of the signal may be increased in response to the detection of vehicles. Changes in brightness and duration of the signal may also be based on environmental conditions such as ambient light or weather.

The helmet system may also incorporate and connected to a smart phone or other handheld device having navigation ability. For instance, when directions for the navigation system call for a turn, the signals 102 and/or 104 may be automatically activated. This ensures that the user of the cycle can be focused on completing the route.

In addition, navigation instructions can be communicated to the driver of the cycle by audio or tactical messages that indicate the next navigational action like a turn, for example.

Figure 9:
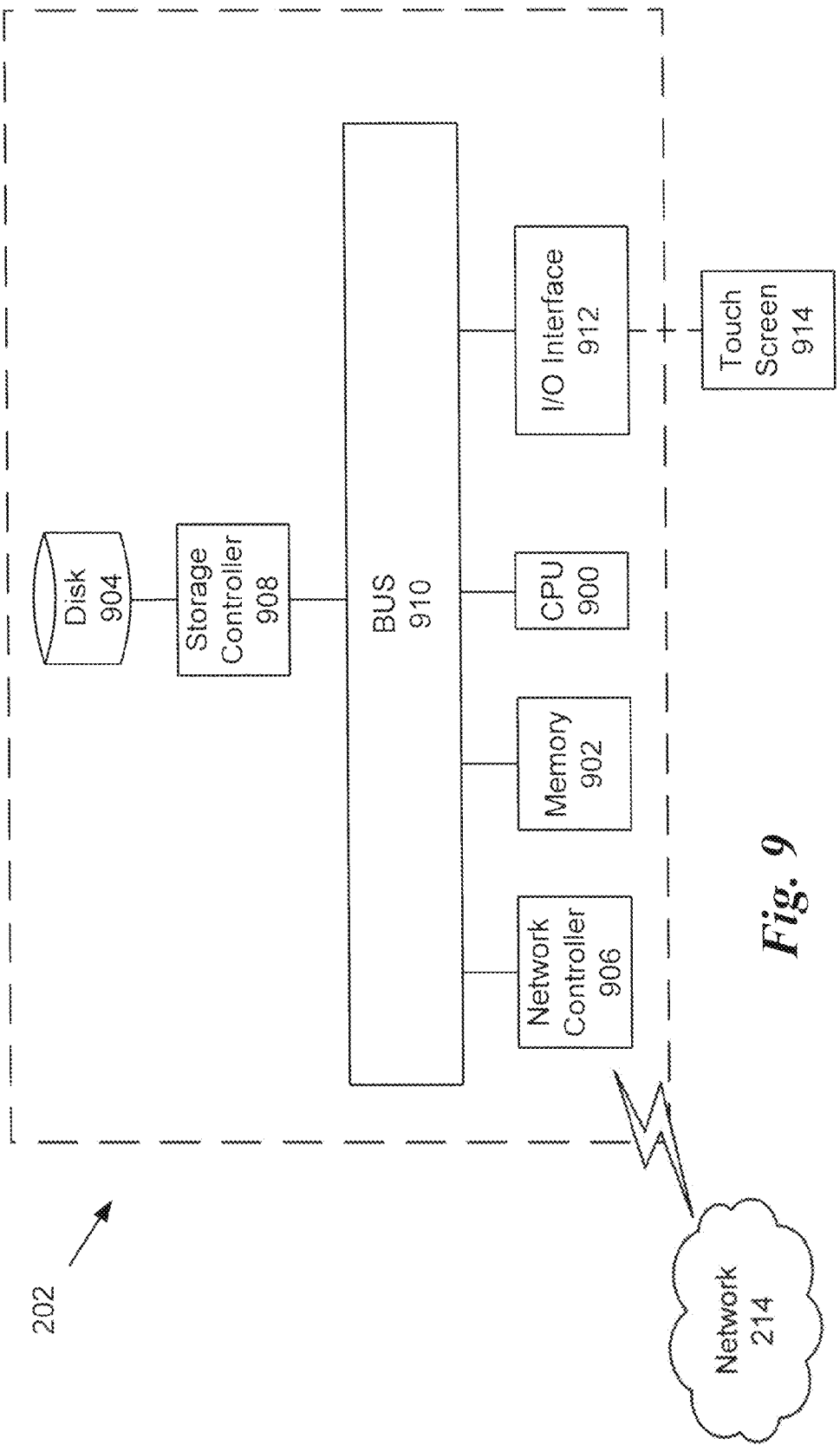
FIG. 9 is an exemplary block diagram of a first microcontroller according to one example.

FIG. 9 is an exemplary block diagram of the first microcontroller 202 according to one embodiment. In FIG. 9, the first microcontroller 202 includes a CPU 900 which performs the processes described above. The process data and instructions may be stored in memory 902. These processes and instructions may also be stored on a storage medium disk 904 such as a hard drive (HDD) or portable storage medium. Further, the claimed advancements are not limited by the form of the computer-readable media on which the instructions of the inventive process are stored. For example, the instructions may be stored on RAM, ROM, PROM, EPROM, EEPROM, hard disk or any other information processing device.

Further, the claimed advancements may be provided as a utility application, background daemon, or component of an operating system, or combination thereof, executing in conjunction with CPU 900 and an operating system such as Microsoft Windows 7, UNIX, Solaris, LINUX, Apple MAC-OS and other systems known to those skilled in the art.

CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The first microcontroller in FIG. 9 also includes a network controller 906, such as an Intel Ethernet PRO network interface card from Intel Corporation of America, for interfacing with network 214. As can be appreciated, the network 214 can be a public network, such as the Internet, or a private network such as an LAN or WAN network, or any combination thereof and can also include PSTN or ISDN sub-networks. The network 214 can also be wireless such as a cellular network including EDGE, 3G and 4G wireless cellular systems. The wireless network can also be WiFi, Bluetooth, or any other wireless form of communication that is known. A general purpose I/O interface 912 interfaces with a touch screen panel 914.

The general purpose storage controller 908 connects the storage medium disk 904 with communication bus 910, which may be an ISA, EISA, VESA, PCI, or similar, for interconnecting all of the components of the first microcontroller 202. A description of the general features and functionalities of the touch screen 914, storage controller 908, and network controller 906 is omitted herein for brevity as these features are known.

Figure 10:
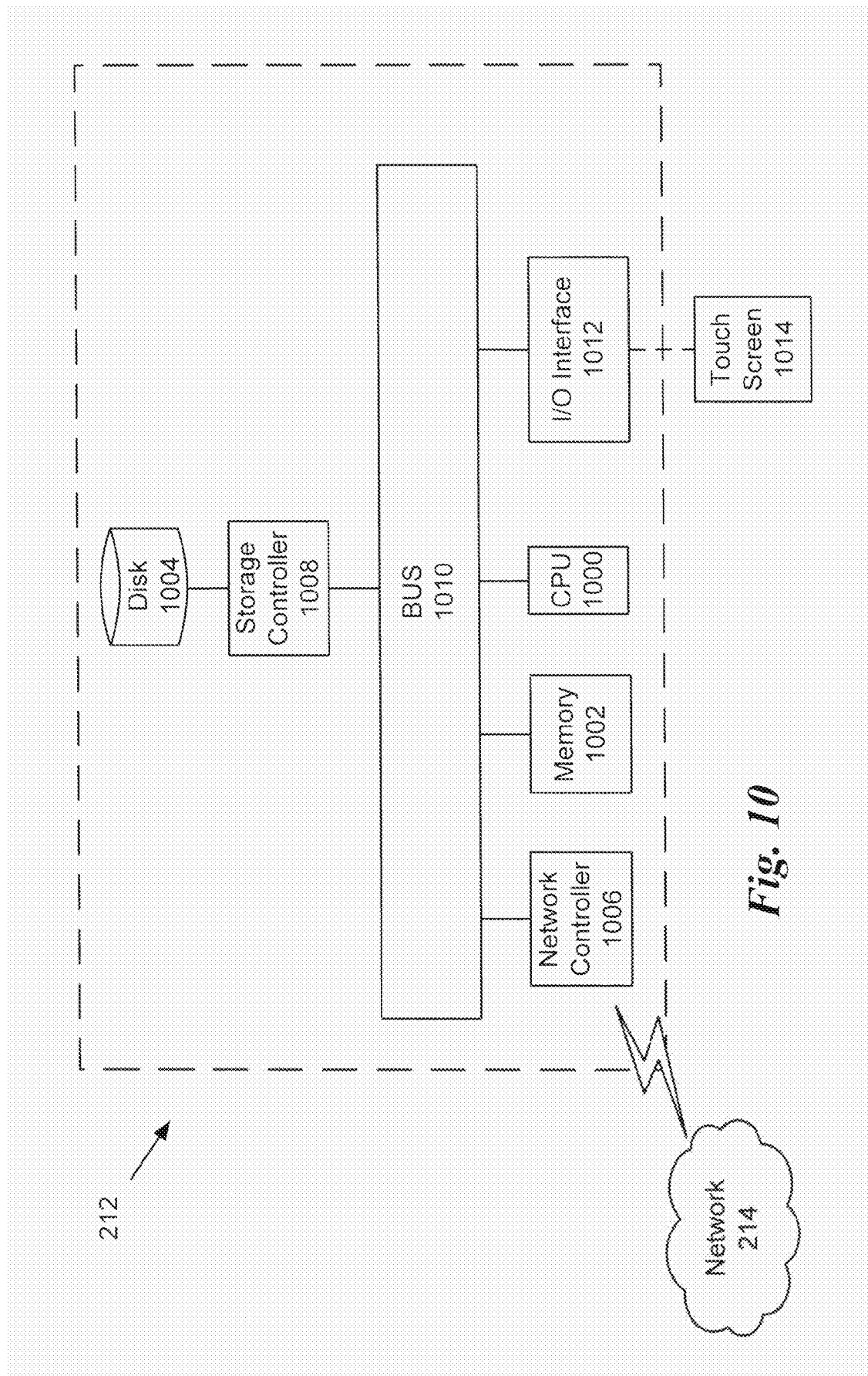
FIG. 10 is an exemplary block diagram of a second microcontroller according to one example.

FIG. 10 is an exemplary block diagram of the second microcontroller 212 according to one embodiment. In FIG. 10, the second microcontroller 212 includes a CPU 1000 which performs the processes described above. The process data and instructions may be stored in memory 1002. These processes and instructions may also be stored on a storage medium disk 1004 such as a hard drive (HDD) or portable storage medium. Further, the claimed advancements are not limited by the form of the computer-readable media on which the instructions of the inventive process are stored.

For example, the instructions may be stored on RAM, ROM, PROM, EPROM, EEPROM, hard disk or any other information processing device.

Further, the claimed advancements may be provided as a utility application, background daemon, or component of an operating system, or combination thereof, executing in conjunction with CPU 1000 and an operating system such as Microsoft Windows 7, UNIX, Solaris, LINUX, Apple MAC-OS and other systems known to those skilled in the art.

CPU 1000 may be a Xenon or Core processor from Intel of America or an Opteron processor from AMD of America, or may be other processor types that would be recognized by one of ordinary skill in the art. Alternatively, the CPU 1000 may be implemented on an FPGA, ASIC, PLD or using discrete logic circuits, as one of ordinary skill in the art would recognize. Further, CPU 1000 may be implemented as multiple processors cooperatively working in parallel to perform the instructions of the inventive processes described above.

The second microcontroller 212 in FIG. 10 also includes a network controller 1006, such as an Intel Ethernet PRO network interface card from Intel Corporation of America, for interfacing with network 214. A general purpose I/O interface 1012 interfaces with a touch screen panel 1014. The general purpose storage controller 1008 connects the storage medium disk 1004 with communication bus 1010, which may be an ISA, EISA, VESA, PCI, or similar, for interconnecting all of the components of the second microcontroller 212.

A system which includes the features in the foregoing description provides numerous advantages to the users. In particular, the helmet with an adaptive light notification system increases the cyclist safety by increasing the visibility of the intended turn direction of the cyclist to others. The system operates with minimal interaction by the user. In addition, the helmet is equipped with sidelights that are activated by the head movement. The sidelights increase the visibility of the user from all directions.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An adaptive light notification system, comprising:
   a head protection enclosure that ensures protection of a head;
   a turn signal removably attached to the head protection enclosure;
   a sensor that activates the turn signal;
   a sidelight removably attached to the head protection enclosure;
   an accelerometer attached to the head protection enclosure that detects head movement;
   a camera that detects presence of another vehicle within a predetermined area;
   first wireless communication circuitry attached to a vehicle;
   second wireless communication circuitry attached to the head protection enclosure;
   a first microcontroller that generates and transmits an activation signal via the first wireless communication circuitry;
   a second microcontroller configured to
      activate the turn signal in response to receiving the activation signal using the second wireless communication circuitry,
      vary brightness of the turn signal based on presence of the another vehicle detected by the camera,
      activate the sidelight in response to detecting head movement,
      receive directions from a navigational device, and
      activate the turn signal based on the directions.

2. The system of claim 1 wherein the sensor is activated by an object motion.

3. The system of claim 2, wherein the object is a user hand.

4. The system of claim 2, wherein a right turn signal is activated in response to determining that a right sensor has detected the object motion and a left turn signal is activated in response to determining that a left sensor had detected the object motion.

5. The system of claim 1, wherein the first microcontroller is further configured to:
   detect a hand signal;
   activate a left turn signal in response to determining that the hand signal is a proper signal for a left turn; and
   activate a right turn signal in response to determining that the hand signal is the proper signal for a right turn.

6. The system of claim 1, wherein the first microcontroller is further configured to:
   validate a sensor activation by comparing readings from the sensor with predetermined values based on a type of the sensor; and
   transmit the activation signal to the second microcontroller in response to determining that the sensor activation is valid.

7. The system of claim 1, further comprising:
   a second accelerometer attached to the vehicle to detect the vehicle movement; and
   activating the sensor in response to detecting the vehicle movement using the second accelerometer.

8. The system of claim 1, wherein the vehicle is a bicycle.

9. The system of claim 8, wherein the sensor is attached to the bicycle handle.

10. The system of claim 1, wherein the navigational device is a smartphone.

11. The system of claim 1, wherein the sidelight is composed of three indicators controlled by the second microcontroller based on turn signals and the head movement direction.

12. The system of claim 1, wherein the sensor is a proximity sensor, a positive sensitive device or a capacitive touch detector.

13. A head protection enclosure equipped with an adaptive light notification system comprising:
   a turn signal removably attached to the head protection enclosure;
   a sensor that activates the turn signal;
   a sidelight removably attached to the head protection enclosure;

an accelerometer attached to the head protection enclosure that detects head movement;
a camera that detects presence of another vehicle within a predetermined area;
first wireless communication circuitry attached to a vehicle;
second wireless communication circuitry attached to the head protection enclosure;
a first microcontroller that generates and transmits an activation signal via the first wireless communication circuitry;
a second microcontroller configured to
   activate the turn signal in response to receiving the activation signal using the second wireless communication circuitry,
   vary brightness of the turn signal based on presence of the another vehicle detected by the camera,
   activate the sidelight in response to detecting head movement,
   receive directions from a navigational device, and
   activate the turn signal based on the directions.

14. An adaptive light notification method, comprising:
detecting, via processing circuitry, an activation signal from a sensor;
activating, by the processing circuitry, a turn signal removably attached to a head protection enclosure;
detecting, by an accelerometer attached to the head protection enclosure, a head movement;
activating, by the processing circuitry, a sidelight removably attached to the head protection enclosure based on the head movement;
detecting, by a camera, presence of another vehicle within a predetermined area; and
varying brightness of the turn signal based on the presence of the another vehicle detected by the camera.

15. The method of claim 14, further comprising:
detecting a hand signal;
activating a left turn signal in response to determining that the hand signal is a proper signal for a left turn; and
activating a right turn signal in response to determining that the hand signal is the proper signal for a right turn.

16. The method of claim 14, further comprising:
setting the brightness to a high value in response to determining the presence of another vehicle within the predetermined area.

17. The method of claim 14, further comprising:
validating the activating signal by comparing readings from the sensor with predetermined values based on a type of the sensor; and
activating the turn signal in response to determining that the activating signal is valid.

18. The method of claim 14, further comprising:
receiving, via communication circuitry, navigational directions; and
activating the turn signal based on the navigational directions.

19. The method of claim 14, wherein the sidelight is composed of three indicators controlled by the processing circuitry based on the head movement direction.

20. The method of claim 14, wherein the sensor is a proximity sensor, a positive sensitive device or a capacitive touch detector.

* * * * *